United States Patent [19]

Haywood

[11] 4,038,047

[45] July 26, 1977

[54] METHOD OF MAKING A FLEXIBLE RESILIENT ABRASIVE

[75] Inventor: George L. Haywood, Latham, N.Y.

[73] Assignee: Norton Company, Worcester, Mass.

[21] Appl. No.: 171,449

[22] Filed: Aug. 13, 1971

Related U.S. Application Data

[63] Continuation-in-part of Ser. No. 815,942, April 14, 1969, abandoned, and Ser. No. 638,042, May 12, 1967, Pat. No. 3,607,159.

[51] Int. Cl.² .............................................. B24D 3/32
[52] U.S. Cl. ........................................ 51/295; 51/296; 51/298 A
[58] Field of Search .......................... 51/295, 296, 298; 264/48

[56] References Cited

U.S. PATENT DOCUMENTS

| | | | |
|---|---|---|---|
| 2,536,183 | 1/1951 | Jamieson | 51/298 |
| 2,780,533 | 2/1957 | Hurst | 51/298 |
| 3,281,259 | 10/1966 | Lux et al. | 264/48 |
| 3,281,513 | 10/1966 | Stripp et al. | 264/48 |
| 3,401,490 | 9/1968 | Mora | 51/295 |

Primary Examiner—Donald J. Arnold
Attorney, Agent, or Firm—Oliver W. Hayes

[57] ABSTRACT

A resilient, controlled-density, porous, abrasive material is manufactured having a backing member which in the preferred embodiment is a foam layer of a plurality of discrete resilient particles of varying degrees of compressibility. The backing member is provided from a larger body of foam material reconstituted from particulate foam. The surface of the backing member, on which is coated an abrasive grain - binder adhesive slurry, is subjected, prior to the coating of the slurry on the particulate foam layer, to the action of a plurality of rapidly moving small abrasive particles whereby a relatively non-compressive shearing of the foam surface is effected to condition it for reception of abrasive grains and associated binder adhesive and to produce a uniform thickness of the porous abrasive grain support.

5 Claims, 2 Drawing Figures

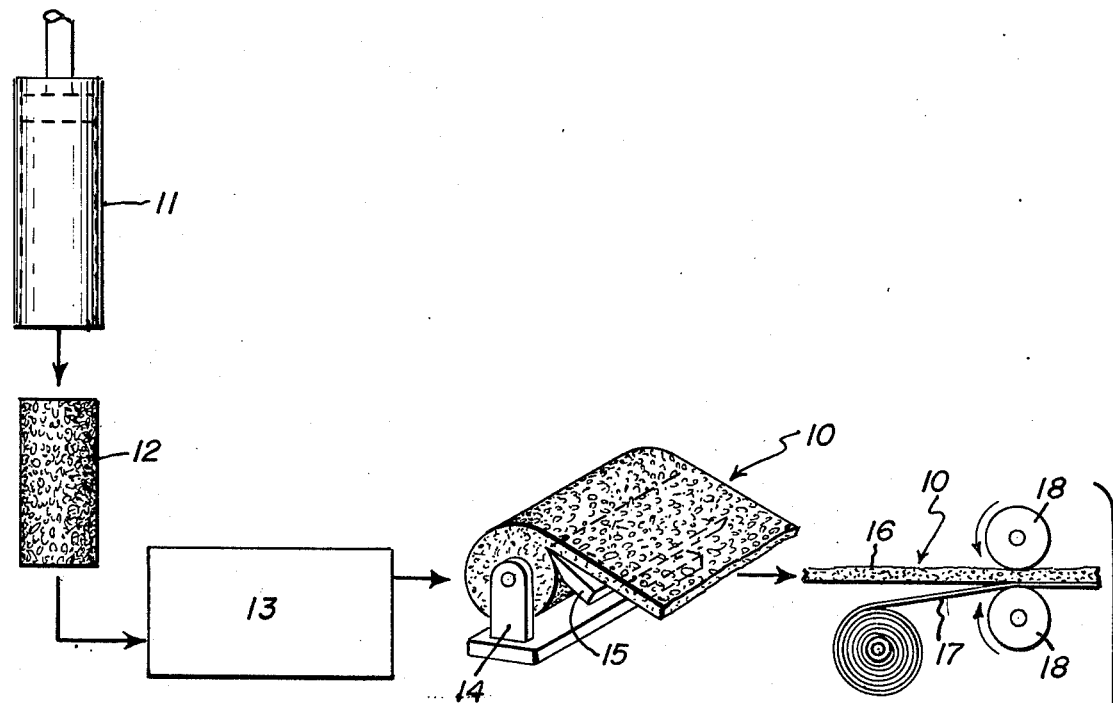
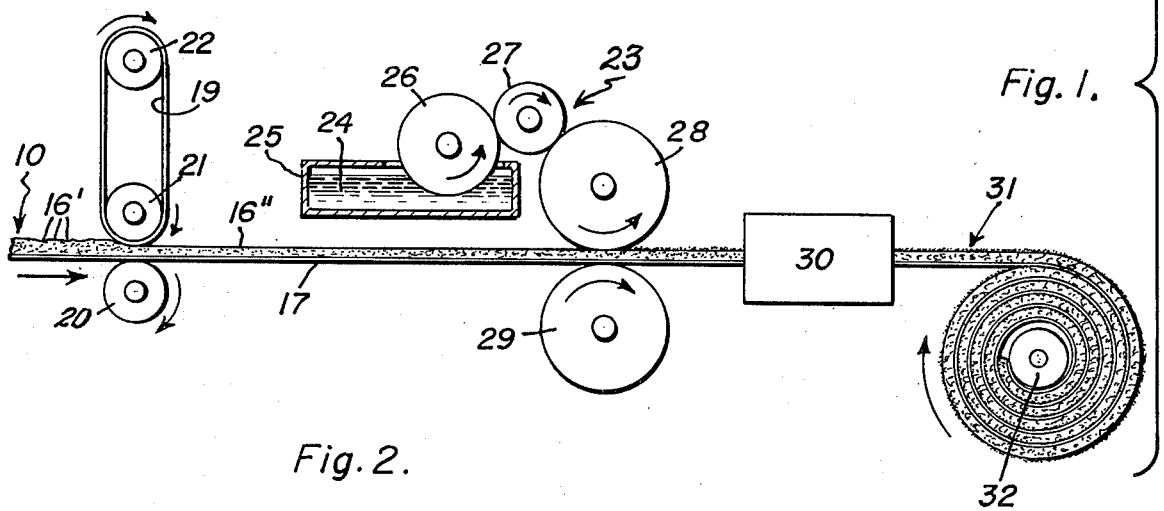
Fig. 1.
Fig. 2.
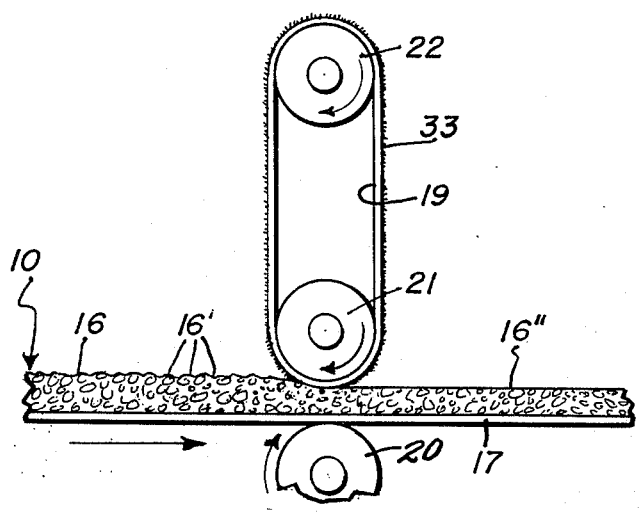
Inventor:
George L. Haywood,
by Herbert L. Gatewood
His Attorney.

METHOD OF MAKING A FLEXIBLE RESILIENT ABRASIVE

CROSS-REFERENCES TO RELATED APPLICATIONS

This application is a continuation-in-part of my co-pending applications Ser. No. 815,942, now abandoned, and Ser. No. 638,042, and now U.S. pat. No. 3,607,159, filed Apr. 14, 1969 and May 12, 1967, respectively.

BACKGROUND OF THE INVENTION

1. Field of the Invention

This invention relates in general, to the manufacture of abrasive material in the nature of coated abrasive material and, more specifically, to an abrasive material designed to give both high finish and stock removal.

2. Description of the Prior Art

Over the years, it has been customary to use a relatively agressive abrasive material for stock removal and polishing and a non-abrassive or only slightly abrasive material for buffing to a high finish. There has now been developed a resilient, controlled density, porous abrasive material similar, in some respects, to conventional coated abrasive material which may be used, quite advantageously, for either or both of these different applications.

Such an abrasive material, comprising a laminate of a foam layer and a flexible reinforcing backing member, is disclosed in my above-mentioned co-pending application, Ser. No. 638,042, filed May 12, 1967 for Saturated Resilient Abrasive Laminate and application Ser. No. 632,978 filed Apr. 24, 1967, now abandoned, for Resilient Abrasive Laminate, the disclosures of both of the applications being incorporated herein by reference.

Although the resilient, controlled density, porous, abrasive material has been found quite satisfactory in many respects, one problem associated with its use heretofore is that it tends to produce a varying finish on the material it is used to abrade. Although this feature is not critical in many instances, it can be critical in others. In any event, the production of a uniform, constant-performing abrasive product is desirable.

SUMMARY OF THE INVENTION

As disclosed in my above-mentioned prior applications, the preferred method of manufacture of the abrasive material involves the slitting of a large roll of foam material reconstituted from particulate foam to form a thin, resilient, controlled-density, porous support for abrasive grain. This support or sheet of foam is then laminated to a supporting backing material, such as a woven cloth used conventionally in the coated abrasive art, and is subsequently coated on its surface, and to varying degrees in its interior, with a slurry comprising abrasive grain and a suitable adhesive binder.

In accordance with the invention herein, the thin sheet of foam, preferably after it has been laminated to a backing material, before the abrasive grain-binder slurry is applied, is subjected to a surface abrading step. Quite advantageously, this abrading step has been found to produce superior results in the action of the finished abrasive product although the physical appearance and feel of the abraded surface is not materially different from the surface prior to abrading.

DRAWINGS

FIG. 1 is a diagrammatic illustration of the overall method of manufacture of the abrasive product.

FIG. 2 is an enlarged representation showing the abrading step of the invention in the process shown in FIG. 1.

DESCRIPTION OF THE PREFERRED EMBODIMENTS

More specifically, and referring now to FIG. 1 of the drawing, the foam material 10 to be treated by the present method, in the preferred embodiment of the abrasive material, comprises resilient particles or granules of foam. These may be formed by shredding waste or virgin foam to the desired particle size which in general will be in the order of 1/16 to ¼ inch in diameter. Any foam material can be used but it is preferred to use polyester or polyether types of polyurethane foam.

Although not shown in the drawing, the particulate foam and a suitable resinous binder therefor are intermixed after which the binder coated particulate foam is fed into a compactor 11. Various binders may be used depending somewhat upon the particular foam material utilized; however, those which will be found suitable include conventional polyurethane adhesive compositions.

In compactor 11, the foam particles are bonded to each other by the resinous binder and a large cylinder 12 is reconstituted from the particulate foam. As shown in the drawing, such a cylinder of foam is extruded from the compactor. Cylinder 12 is usually cured in an oven 13 to set the resin binder after which the foam cylinder or log is then fed to a peeler or slitter 14 which utilizes a knife 15 to peel a continuous, long, thin, sheet 10 of foam from cylinder 12. The density of the compacted foam granule sheet should be in the range of 6 to 30 pounds/cubic foot with a preferred density range of from 12 to 18 pounds/cubic foot.

The surface 16 of the sheet of foam material 10, when it leaves peeler 14, will be observed on close examination to possess a plurality of small waves therein such feature being more clearly shown by reference numeral 16' in FIG. 2 of the drawing. This is a phenomenon found peculiar to the knife cutting of the foam material. The knife appears to form compression waves ahead of itself as it slices the sheet of foam from the cylinder. Where a similar layer of foam, using the same foam granules and binder is formed between smooth sheets this type of surface is not exhibited. Nevertheless, the abrading process, as hereinafter made clear, will find application therein as such last-mentioned manner of manufacture of foam material, whether of particulate foam or not, results in a foam layer having an outer skin of little or no porosity. Such an outer skin can be removed by abrading an disclosed herein thus resulting in a relatively smooth, porous surface.

Sheet 10, as disclosed in the drawing, is laminated in conventional fashion to a supporting backing member 17. This may be accomplished by passing foam layer 10 in supperposed fashion, as shown, on backing member 17 through the nip formed by laminating rolls 18.

Backing member 17 may be any flexible reinforcing and supporting member such as paper, woven cloth, polymeric films, fiber or any of the backing member materials conventionally used for coated abrasive manufacture.

The thus formed lamination is then passed, in accordance with my invention, in contact with a suitable abrasive medium, this being, in the preferred aspects of the invention, an endless abrasive belt 19. As shown in the drawing, a back-up roll 20 is provided to give support to the foam layer 10 as its passes under abrasive belt 19 and the associated driver contact and idler rolls 21 and 22. The clearance between abrasive belt 19 and roll 20 is such as to permit the belt 19 to engage with and cut the upper surface 16 of sheet 10. It will be noted that surface 16 is one of two surfaces generated by knife 15 of peeler 14.

Sheet 10 and its associated backing 17 is then passed to roll coating station 23 where the abrasive grain and adhesive binder are applied to the abraded surface 16" by means of a slurry 24 thereof contained in a suitable vessel 25. As shown in the drawing, slurry 24 may be transferred in conventional fashion to the abraded surface 16" by means of rolls 26, 27, 28, and 29; however, obviously, other means of coating the abrasive grain, resin binder slurry may be used to advantage.

The slurry coated substrate is then passed through oven 30 after which the abrasive material 31 is wound up in roller form 32 in preparation for subsequent conversion into belts, sheets, discs, etc., conventionally manufactured from coated abrasive material.

The abrading medium, as before disclosed, is preferably a coated abrasive belt and is driven so that it "upcuts" the surface of the sheet of foam material. This feature is more clearly shown in FIG. 2 wherein the abrasive belt 19 is driven in the direction shown by the arrows and the foam material 10 moves into the belt from left to right. This view is exaggerated to show the manner in which abrasion takes place. Because of the multitude of sharp cutting points 33 on the abrasive belt, cutting takes place without generation of the compression wave found in knife cutting and the surface of the foam layer is sheared or abraded in a relatively non-compressive manner by the teeth of the abrasive media and while in a substantially uncompressed state. This results in a surface 16" which is much more uniform in its compressibility than the somewhat rough, undulating surface 16' which was formed previously by knife cutting.

Preferably, the grit size of the abrasive media on belt 19 lies in the range of grits 50 to 240 with the optimum for most foam sheets being from grit 120 to grit 180. While any abrasive grain material can be used in the practice of the invention, silicon carbide grain is preferred due to its extremely sharp cutting edges.

In practice, the feed rate of the foam layer can be generally about 65 to 95 feet per minute although, obviously, slower feed rates can be employed if desired. The abrasive belt speed or speed of the abrasive particles relative to the foam surface being abraded is from 2,000 to 6,500 surface feet per minute with a preferred range of from 5,000 to 5,500 surface feet per minute. The back-up roll used to support the foam lamination during the abrasion step may vary from 1 ½ inches to 14 inches.

While, as before-disclosed, an abrasive belt is the preferred cutting media, obviously, others equally suitable will occur to those skilled in the abrasive art. A drum covered with coated abrasive material could be used if desired. The critical feature herein is to use a coated abrasive product with a multiplicity of small sharp cutting edges moving relatively rapidly with respect to the surface of the foam material.

What I claim is:

1. In a method of manufacturing a resilient, controlled-density, porous, abrasive material comprising a foam backing member, said method comprising applying to a surface of the foam backing member a composition comprising abrasive grain and binder therefor, the improvement comprising:
    a. forming a self-sustaining cylinder of closely-packed small, resilient foam particles bound one to the other by an adhesive binder;
    b. peeling a thin continuous sheet from the cylinder by a compressive shearing action; and
    c. before application of the abrasive grain-bonding adhesive, subjecting the surface of the foam backing member to a non-compressive shearing action whereby to produce a smooth, porous, surface.

2. In a method of manufacture as set forth in claim 1, the method further comprising laminating a supporting backing material to the peeled foam sheet prior to the shearing action.

3. In a method of manufacture as set forth in claim 2, said resilient foam particles comprising polyurethane foam.

4. In a method of manufacture as set forth in claim 3, said abrasive grain being in the range of grits 50 to 240.

5. In a method of manufacture as set forth in claim 4, said small abrasive particules being silicon carbide abrasive grain.

* * * * *